Figure 1:
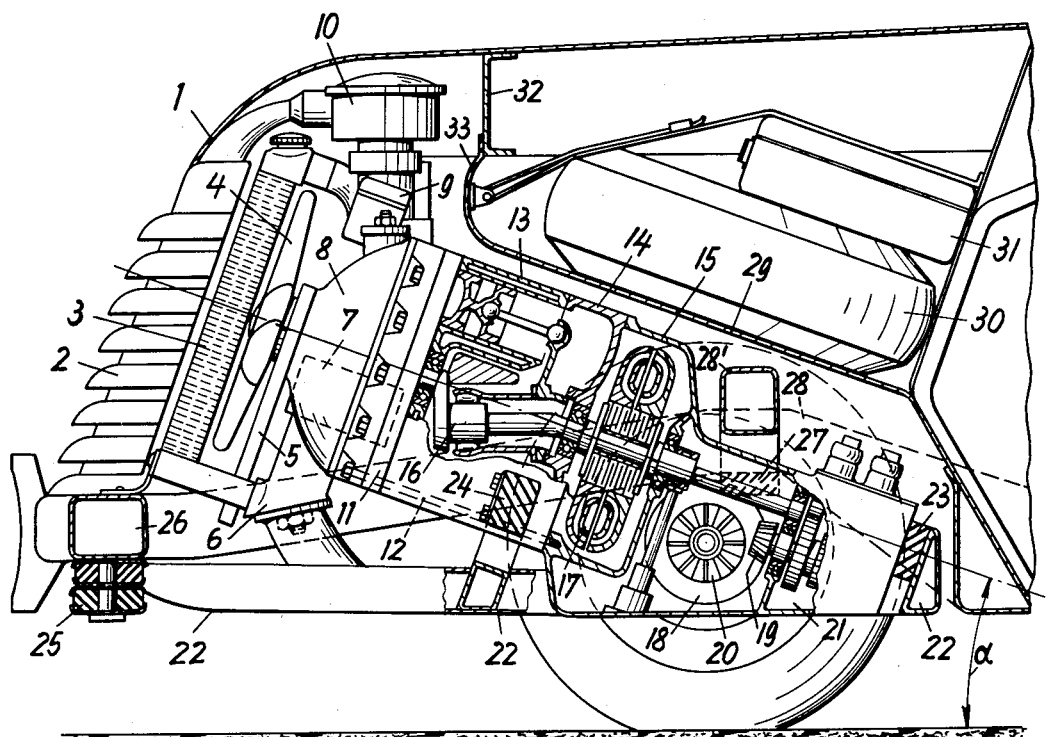

July 31, 1956   J. DAUBEN   2,756,834
POWER PLANT AND DRIVING MECHANISM FOR MOTOR VEHICLE
Filed Jan. 15, 1952   2 Sheets-Sheet 1

INVENTOR
JOSEPH DAUBEN
BY Dicke and Padlon
ATTORNEYS.

United States Patent Office 2,756,834
Patented July 31, 1956

2,756,834

POWER PLANT AND DRIVING MECHANISM FOR MOTOR VEHICLE

Joseph Dauben, Stuttgart, Germany, assignor to Daimler-Benz Aktiengesellschaft, Stuttgart-Unterturkheim, Germany Application January 15, 1952, Serial No. 266,459

Claims priority, application Germany January 16, 1951

3 Claims. (Cl. 180—54)

In automotive engineering there exists more and more an endeavor to unite the entire power generating and power transmitting equipment into one aggregate and to place it in the front part of the car as a front power plant or to mount it in the rear of the car with a rear axle drive. With these two systems, a power transmission extending below the seating or passenger compartment can be avoided so that the seats may be arranged lower and yet permit a level floor. Thus, the power transmission is considerably shortened, it is lighter and also more inexpensive, and it also makes it easier to lessen the noise inside the car originating from the power transmission.

It is not difficult to combine the entire power and power transmission equipment into one aggregate with small vehicles of a piston displacement up to about 120 cu. in. But in connection with constructions of big cars with multi-cylinder engines (8–12 cylinders), for example, as front driven cars, considerable difficulties are encountered with respect to the installation, dimensions and accessibility when using the in-line or V-type engines hitherto usual. If such an engine, for example, an eight-cylinder in-line engine, is arranged ahead of the axle, it will project to such an extent that the vehicle becomes top-heavy and will no longer be good-looking. If the engine is arranged behind the axle, then it will project too far into the body space or passenger compartment and will thereby render it difficult to provide proper accessibility.

One object of the invention is the elimination of these difficulties for the purpose of obtaining a short overall length and slight space requirement along with a high power of the driving aggregate. A characteristic of the invention consists in using a swashplate engine which is united with the transmission and the longitudinal axis of the unit is inclined upward toward the end of the vehicle. An angle of about 15 to 35° will best answer the purpose.

The swashplate engine being very short and its overall length being independent of the number of cylinders there is no difficulty in installing below the hood an engine of a piston displacement of 3 to 5 liters with 9 to 15 cylinders within the space existing in the usual cars of modern designs. The space for the passengers may still be placed farther in front as only the transmission is located behind the axle. Furthermore it is in favor of the swashplate engine that not only its overall length is shorter than any other design, but that its width also is narrower than any V-engine or engine with opposite cylinders arranged horizontally. Therefore it will not be difficult to properly arrange the steering gear, the storage battery, the starter etc. in the engine compartment.

A further object of the invention resides in the provision of an appropriate arrangement of mounting the engine.

A further object of the invention resides in the provision of a ready accessibility to the accessories.

A further object of the invention resides in the provision of an appropriate utilization of the radiator.

As good accessibility exists in a swashplate engine arranged in this way, particularly from the front of the vehicle with front drive, or from behind of the vehicle with rear drive, according to further characteristics of the invention all parts of the driving unit as well as practically all the accessories also are arranged so that they can be mounted and dismounted from the front, or from behind by means of socket wrenches or power actuated tools without the fitter's changing his place. As a multi-cylinder swashplate engine runs practically smoothly by reason of its perfect mechanical balance and its steady torque, the radiator can be secured to the engine without risk of leaking by means of elastic brackets. In this case the radiator can additionally serve as a torsional vibration dampener.

Another object of the invention relates to an advantageous utilization of the body space housing the engine.

Figure 2:
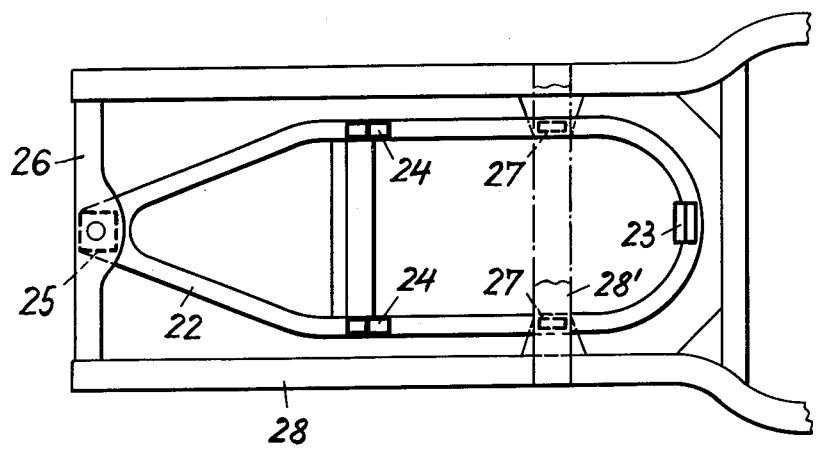

Further objects, features and advantages of the present invention will become more clear from the following description when taken in connection with the accompanying drawing which shows, for purposes of illustration only, one preferred embodiment in accordance with the present invention, and wherein Figure 1 is a longitudinal cross-sectional view through the motor compartment in accordance with the present invention, and Figure 2 is a partial plan view of the main and auxiliary frame used in connection with the arrangement of Figure 1 with certain parts omitted for the sake of clarity.

Figure 1 of the drawing illustrates a longitudinal section through a motor vehicle with a driving aggregate of the above described design installed therein as a front driving aggregate. A similar arrangement may be used as a driving aggregate for rear drive; in this case the direction of motion and the direction of rotation are reversed.

It is the main idea of the invention to unit a swashplate engine, whose crankshaft encloses an angle $\alpha$ of about 15 to 35° with the horizontal longitudinal axis of the vehicle, with the axle drive and the transmission in order to obtain a complete unitary aggregate. By this inclination in connection with the construction peculiarity of the swashplate engine, particularly its short overall length, even with a great number of cylinders advantages may be obtained thereby as regards the easy accessibility and dismantling or disassembly of all parts which could not be obtained heretofore by any other design.

After raising the hood 1 along with the front radiator shell grill 2, first the radiator is easily accessible. Behind the radiator is fan 4 which is driven by the crankshaft of the engine. A V-belt operates the water pump 6 and the generator 7. The fan is carried by the cone shaped cover 8 containing the induction and exhaust passages. Besides, the cover 8 supports the carburetor 9 along with the air filter 10. Below the cover 8 there is the cylinder head 11, in which a rotary valve is suitably arranged as a single controller for all cylinders. The cylinder head 11 is pressed on the cylinder block 13 by means of screws 12, and packed against it; in this way the cylinder block 13 is at the same time pressed against the crankcase 14 and this one again on the clutch casing 15. All these parts are centered together or led by set pins. The screws 12 are screwed into the clutch casing 15. This arrangement allows the cylinder head 11, the cylinder block 13, the crankcase 14 along with the crankshaft 16, and the clutch 17 to be taken off toward the front, in parts or together. The clutch casing 15 also embodies the housing for the axle drive, particularly for the bevel gears 18 and 19, and the differential 20. Adjacent to the clutch casing 15 there is the gear box 21 of the transmission gear which may be screwed on the clutch casing or may be formed integral therewith.

The entire driving aggregate is rubber-cushioned on the auxiliary frame 22 in a rear rubber pad 23 and also in the center of gravity of the driving aggregate on two rubber pads 24 right and left of the crankcase. The auxiliary frame 22 containing entire wheel guide, spring suspension, shock absorber and the steering along with the steering linkage, is elastically connected with the frame by means of rubber pads, for example by a front rubber connection 25 below the front cross member 26 and by two rubber pads 27 on the right and left below the frame side members 28. The frame side members 28 are connected together by a transverse member 28' which may be connected to the side members 28 in any suitable manner. Above the driving aggregate a baggage compartment for a spare wheel 30 and parcel 31 is separated from the engine compartment by a sheet metal wall or shelf 29. This compartment is made airtight toward the front by a partition wall 32 closely connected with the hood by means of rubber lip 33.

The invention is not limited to the illustrated example of design.

What I claim is:

1. In a motor vehicle with a driving unit which may be readily assembled and disassembled from the vehicle end, the combination comprising a main frame including a pair of longitudinal side members and a transverse end member connected to said side members, an auxiliary frame extending near said end member and near said side members at points spaced from said end member, means including rubber cushions inserted between said auxiliary frame and said members at said end member and at said points for resiliently mounting said main frame on said auxiliary frame, a driving unit including a plurality of coaxial housing sections, one of said sections including a substantially barrel-shaped engine of the swashplate type and the other sections including a clutch and transmission gearing, a plurality of circumferentially distributed bolt means each extending through all of said sections parallel to the axis of said unit for interconnecting said sections to enable withdrawal of at least some of said sections clear of said auxiliary frame upon loosening said bolt means from the vehicle end, and resilient means for mounting said unit on said auxiliary frame with the axis thereof located substantially in the central vertical plane of said auxiliary frame and slanting downwardly in a direction away from said end member, the transverse plane passing through the center of gravity of said unit being located between said end member and said points, the inner end of said auxiliary frame and the inner end of said unit being located inwardly of said points in proximity to one another, and said resilient means including a pair of rubber cushions located substantially within said transverse plane and a rubber cushion at said inner end of said auxiliary frame.

2. In a motor vehicle with a driving unit which may be readily assembled and disassembled from the vehicle end, the combination comprising a main frame including a pair of longitudinal side members and a transverse end member connected to said side members, an auxiliary frame extending near said end member and near said side members at points spaced from said end member, means including rubber cushions inserted between said auxiliary frame and said members at said end member and at said points for resiliently mounting said main frame on said auxiliary frame, a driving unit provided with a substantially barrel-shaped engine of the swashplate type and including a plurality of housing sections mounted coaxially upon one another, a first one of said sections forming a housing for the change speed transmission, the axle transmission and the clutch, a second one of said sections forming a housing for the swashplate of said barrel-shaped engine, a third one of said sections forming a housing for the cylinders of said engine, and a fourth one of said sections constituting the cylinder head, a plurality of circumferentially distributed bolt means each extending through all of said sections parallel to the axis of said unit for interconnecting said sections to enable withdrawal of said second, third, and fourth sections clear of said auxiliary frame upon loosening said bolt means from the vehicle end, and resilient means for mounting said unit on said auxiliary frame with the axis thereof located substantially in the central vertical plane of said auxiliary frame and slanting downwardly in a direction away from said end member, the transverse plane passing through the center of gravity of said unit being located between said end member and said points, the inner end of said auxiliary frame and the inner end of said unit being located inwardly of said points in proximity to one another, and said resilient means including a pair of rubber cushions located substantially within said transverse plane and a rubber cushion at said inner end of said auxiliary frame.

3. In a motor vehicle with a driving unit which may be readily assembled and disassembled from the vehicle end, the combination comprising a main frame including a pair of longitudinal side members and a transverse end member connected to said side members, an auxiliary frame extending near said end members and near said side members at points spaced from said end member, means including rubber cushions inserted between said auxiliary frame and said members at said end member and at said points for resiliently mounting said main frame on said auxiliary frame, a driving unit including a plurality of coaxial housing sections, one of said sections including a substantially barrel-shaped engine of the swashplate type and another section including the clutch and transmission gearing, a plurality of circumferentially distributed bolt means each extending through all of said sections parallel to the axis of said unit for interconnecting said sections to enable withdrawal of said one section clear of said auxiliary frame upon loosening said bolt means from the vehicle end to thereby facilitate assembly and disassembly of said engine, a radiator at the outer end of said unit, resilient means for attaching said radiator to said unit, a fan rotatably mounted on said unit in coaxial relationship therewith intermediate said radiator and said unit, means for operating said fan by said unit, and resilient means for mounting said unit on said auxiliary frame with the axis thereof located substantially in the central vertical plane of said auxiliary frame and slanting downwardly in a direction away from said end member, the transverse plane passing through the center of gravity of said unit being located between said end member and said points, the inner end of said auxiliary frame and the inner end of said unit being located inwardly of said points in proximity to one another, and said second-mentioned resilient means including a pair of rubber cushions located substantially within said transverse plane and a rubber cushion at said inner end of said auxiliary frame.

References Cited in the file of this patent

UNITED STATES PATENTS

| Number | Name | Date |
| --- | --- | --- |
| 1,698,453 | Sardeson et al. | Jan. 8, 1929 |
| 1,948,745 | Curtiss | Feb. 27, 1934 |
| 2,066,530 | Hoffman | Jan. 5, 1937 |
| 2,075,084 | Best | Mar. 30, 1937 |
| 2,102,923 | Szekely | Dec. 21, 1937 |
| 2,128,930 | Fageol et al. | Sept. 6, 1938 |
| 2,159,332 | Lee | May 23, 1939 |
| 2,393,623 | Ehrenberg | Jan. 29, 1946 |

FOREIGN PATENTS

| Number | Country | Date |
| --- | --- | --- |
| 787,834 | France | July 16, 1935 |
| 872,978 | France | Mar. 2, 1942 |

OTHER REFERENCES

"Engines Without Cranks," in "The Autocar," of July 23, 1937, page 137 of 4 pages, 136–139. Copy in Div. 28.